United States Patent
Song et al.

(10) Patent No.: US 7,327,508 B2
(45) Date of Patent: Feb. 5, 2008

(54) DISPLAY DEVICE USING LIGHT MODULATOR AND HAVING IMPROVED NUMERICAL APERTURE OF AFTER-EDGE LENS SYSTEM

(75) Inventors: Jong Hyeong Song, Gyeonggi-do (KR); Haeng Seok Yang, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 112 days.

(21) Appl. No.: 11/157,483

(22) Filed: Jun. 21, 2005

(65) Prior Publication Data

US 2006/0082857 A1  Apr. 20, 2006

(30) Foreign Application Priority Data

Oct. 15, 2004  (KR) .............. 10-2004-0082756

(51) Int. Cl.
G02B 26/08  (2006.01)
(52) U.S. Cl. ............ 359/223; 359/290; 359/573; 359/637; 353/34; 353/82; 349/201
(58) Field of Classification Search ........ 359/223, 359/290, 573, 637; 353/34, 82; 349/201
See application file for complete search history.

(56) References Cited

U.S. PATENT DOCUMENTS 6,215,579 B1 *  4/2001  Bloom et al. ............ 359/298

6,692,129 B2 *  2/2004  Gross et al. .............. 353/31

FOREIGN PATENT DOCUMENTS

KR  10-2004-0074875 A   5/2005

* cited by examiner

Primary Examiner—Hung X. Dang
Assistant Examiner—Joseph Martinez
(74) Attorney, Agent, or Firm—Christensen O'Connor Johnson Kindness PLLC (57) ABSTRACT

A display device using a light modulator and having an improved numerical aperture (NA) of an after-edge lens system is disclosed. The display device includes an illumination lens, a diffractive light modulator, an NA improvement unit, a filter system and a projection system. The illumination lens converts light into linear parallel light, and outputs the linear parallel light. The diffractive light modulator produces diffracted light beams having a plurality of diffraction orders by modulating the linear parallel light incident from the illumination lens according to an external control signal. The NA improvement unit causes + and − diffracted light beams of the diffracted light beams to come close to each other. The filter system passes only some of the diffracted light beams having predetermined orders, therethrough. The projection system focuses the diffracted light beams onto an object and allows the focused diffracted light to scan the object.

4 Claims, 10 Drawing Sheets

DISPLAY DEVICE USING LIGHT MODULATOR AND HAVING IMPROVED NUMERICAL APERTURE OF AFTER-EDGE LENS SYSTEM

BACKGROUND OF THE INVENTION

1. Field of the Invention

The present invention relates generally to a display device using a light modulator and, more particularly, to a display device using a light modulator and having an improved numerical aperture of an after-edge lens system, in which the numerical aperture of the lens system, which is used to focus diffracted light beams having + and − orders that are formed by the light modulator, is significantly reduced.

2. Description of the Related Art

With the development of micro technology, so-called Micro-Electro-Mechanical System (MEMS) devices and small-sized apparatuses into which MEMS devices are assembled are attracting attention.

An MEMS device constitutes a microstructure on a substrate, such as a silicon substrate or glass substrate, and is a device that is formed by electrically and mechanically connecting a driving body for outputting mechanical driving force to a semiconductor integrated circuit for controlling the driving body. A basic feature of the MEMS device is that the driving body having a mechanical structure is placed in a portion of the MEMS device. The driving body is electrically operated using Coulomb's force generated between electrodes.

Figure 1:
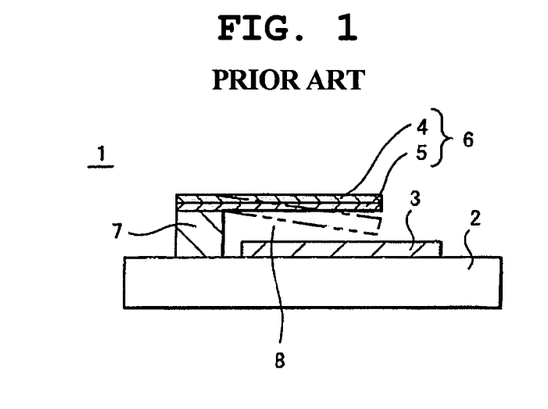
FIGS. 1 and 2 are views illustrating the representative constructions of optical MEMS devices that use the reflection or diffraction of light and are applied to an optical switch and an optical modulation element.
Figure 2:
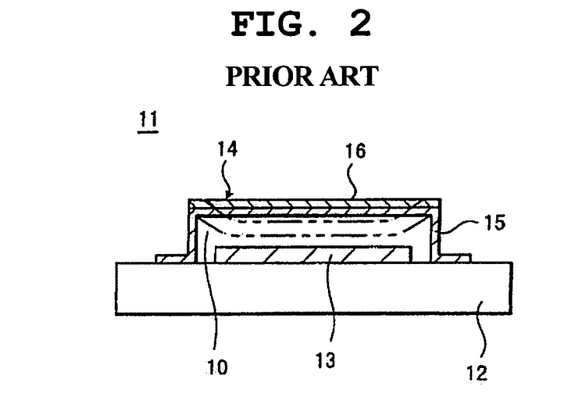

FIGS. 1 and 2 show a representative construction of an optical MEMS device that uses the reflection or diffraction of light and is applied to an optical switch and an optical modulation element.

An optical MEMS device 1 shown in FIG. 1 includes a substrate 2, a substrate-side electrode 3 formed on the substrate 2, a crossbeam 6 provided with a driving-side electrode 4 that is disposed parallel to the substrate-side electrode 3, and a support 7 configured to support one end of the crossbeam 6. The crossbeam 6 and the substrate-side electrode 3 are electrically insulated from each other by an aperture 8 therebetween.

The substrate 2 may be formed of a substrate in which an insulation film is formed on a semiconductor substrate such as a silicon (Si) or gallium arsenide (GaAs) substrate, or an insulation substrate such as a glass substrate. The substrate-side electrode 3 may be formed of a poly-crystal silicon film doped with an impurity, or a metallic film such as a Cr deposition film. The crossbeam 6 includes an insulation film 5 such as a silicon nitride film (SiN film), and a driving-side electrode 4 composed of, for example, an aluminum (AL) film that is formed on the insulation film 5 to have a film thickness of about 100 nm, and that is adapted to also function as a reflective film. The crossbeam 6 is mounted in a cantilever manner such that only one end thereof is supported by the support 7.

In the optical MEMS device 1, the crossbeam 6 is displaced by electrostatic attraction or electrostatic repulsion that is generated between the crossbeam 6 and the substrate-side electrode 3 by voltage applied to the substrate-side electrode 3 and the driving-side electrode 4. For example, the crossbeam 6 is displaced between an equilibrium state and a tilt state with respect to the substrate-side electrode 3, as shown in the solid and dotted lines of FIG. 1.

Another optical MEMS device 11 shown in FIG. 2 includes a substrate 12, a substrate-side electrode 13 formed on the substrate 12, and a beam 14 formed across the substrate-side electrode 13 in the form of a bridge. The crossbeam 14 and the substrate-side electrode 13 are electrically insulated from each other by an aperture 10 that is positioned therebetween.

The crossbeam 14 includes a bridge member 15 formed on the substrate 12 across the substrate-side electrode 13 in the form of a bridge and formed of, for example, an SiN film, and a driving-side electrode 16 formed on the bridge member 15 parallel to the substrate-side electrode 13, adapted to serve as a reflective film, and formed of, for example, an Al film having a film thickness of about 100 nm. The substrate 12, the substrate-side electrode 13 and the crossbeam 14 may have the same construction and material as described in conjunction with FIG. 1. The crossbeam 14 is mounted in a so-called cantilever manner such that only one end thereof is supported by the support 7.

In this optical MEMS device 11, the crossbeam 14 is displaced by electrostatic attraction or repulsion that is generated between the MEMS device and the substrate-side electrode 13 by voltage applied to the substrate-side electrode 13 and the driving-side electrode 16. For example, the crossbeam 6 can be displaced between an equilibrium state and a concave state with respect to the substrate-side electrode 3, as shown by the solid and dotted lines of FIG. 2.

The optical MEMS devices 1 and 11 can be applied as an optical switch having a switch function, in which, when light is radiated onto the surface of each of the driving-side electrodes 4 and 16 also serving as optical reflective films, reflected light is detected in one direction based on the fact that the reflection direction of light varies depending upon the driving position of the crossbeam 6 or 14.

Furthermore, the optical MEMS devices 1 and 11 can be applied as an optical modulation element that modulates the intensity of light. In the case where the reflection of light is used, the intensity of light is modulated by vibrating the crossbeams 6 and 14 based on the amount of reflected light in one direction per unit time. The optical modulation element uses so-called time modulation.

In the case where the diffraction of light is used, an optical modulation element is formed by parallelly arranging a plurality of crossbeams 6 with respect to common substrate-side electrodes 3 and 13, and the height of driving-side electrodes also serving as optical reflective films is changed by the approach and separation of an alternate crossbeam 6 or 14 to and from the common substrate-side electrodes 3 and 13. The intensity of light, which is reflected by the driving-side electrodes, is then modulated via diffraction. This optical modulation element employs so-called spatial modulation.

Figure 3A:
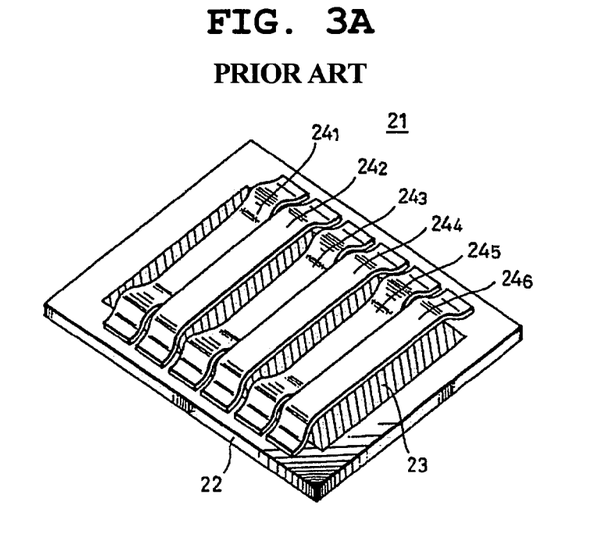
FIGS. 3A and 3B shows the construction of a GLV device that was developed by SLM Corporation as an optical intensity conversion device for a laser display, i.e., a light modulator.
Figure 3B:
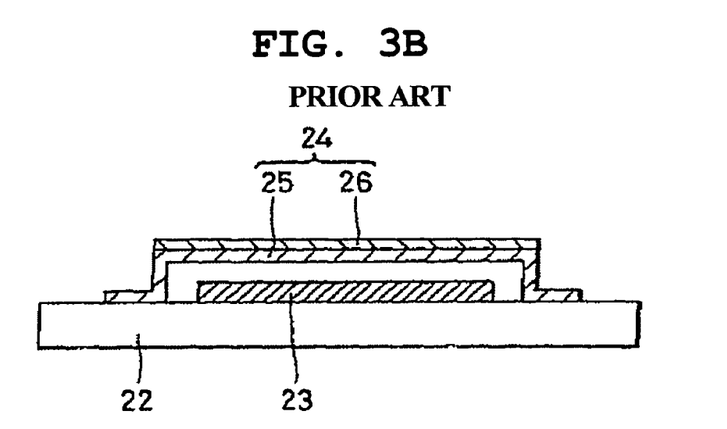

FIG. 3A and FIG. 3B shows the construction of a Grating Light Valve (GLV) device that was developed by Silicon Light Machines (SLM) Corporation as an optical intensity conversion device for a laser display, i.e., a light modulator.

As shown in FIGS. 3A and 3B, in the GLV device 21, a common substrate-side electrode 23 made of a high melting point metal, such as tungsten or titanium, and a nitride film thereof or a thin polysilicon film is formed on an insulation substrate 22 such as a glass substrate. A plurality of, in this example, six beams 24 ($24_1$, $24_2$, $24_3$, $24_4$, $24_5$ and $24_6$) are formed parallel to each other across the substrate-side electrode 23 in the form of a bridge. The substrate-side electrodes 23 and the crossbeams 24 have the same construction as described in conjunction with FIG. 2. That is, a crossbeam 24 is fabricated by forming a driving-side electrode 26, which also serves as a reflective film and is made of an Al film having a thickness of about 100 nm, on the surface of a bridge member 25 that is parallel to the substrate-side electrode 23 and is formed of a SiN film.

A bridge member 25 and crossbeams 24 composed of the driving-side electrodes 26 and adapted to also serve as a reflective film constitute a part that is commonly called a ribbon.

The Al film used as the material of the driving-side electrodes 26 of the crossbeams 24 is a desired material for optical elements because (1) it can be formed relatively easily, (2) the wavelength dispersion of reflectance in a visible light region is small, (3) a natural Al oxide film created on the surface of an Al film serves as a protection film to protect a reflective surface.

Meanwhile, a SiN (silicon nitride) film constituting the bridge member 25 is a SiN film formed by a reduced pressure CVD method. The SiN film has physical properties, such as strength and a coefficient of elasticity, which are suitable for the mechanical driving of the bridge member 25.

If a small voltage is applied between the substrate-side electrode 23 and the driving-side electrodes 26 also serving as the reflective film, the crossbeams 24 approach the substrate-side electrode 23 due to the above-described electrostatic phenomenon. If the application of the voltage is stopped, the crossbeams 24 return to their original state.

The GLV device 21 alternately changes the height of the driving-side electrode 26 also serving as the optical reflective film via the approach and separation operations of the crossbeams 24 with respect to the substrate-side electrodes 23 (i.e., the approach and separation operations of the crossbeams), and modulates the intensity of light, which is reflected from the driving-side electrodes 26 by diffraction (one optical spot is projected for all the six beams 24).

The dynamic characteristics of the crossbeams that are driven using electrostatic attraction and repulsion are mostly determined by the material properties of a SiN film formed by the CVD method. The Al film usually serves as a mirror.

Figure 4:
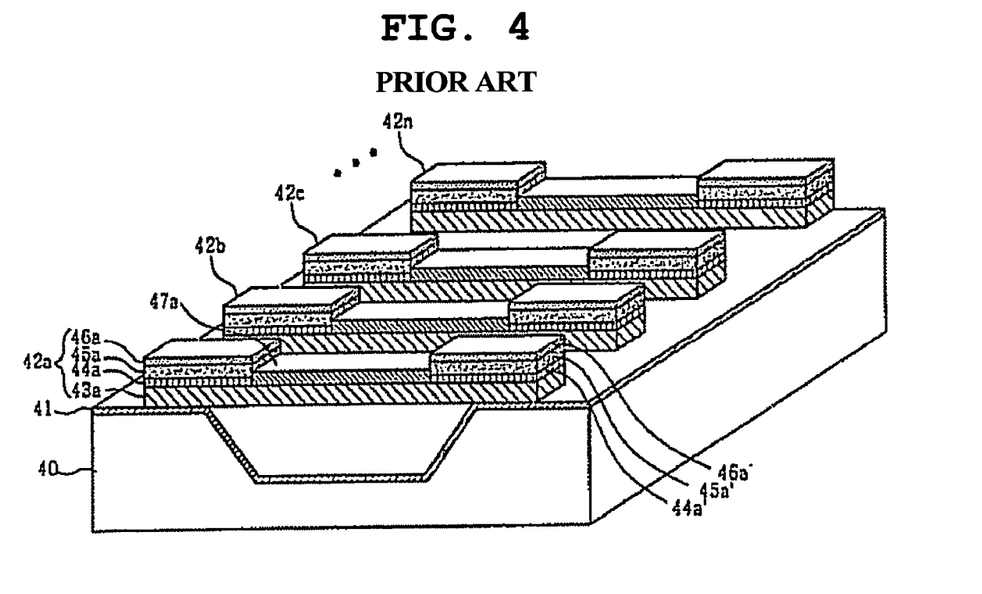
FIG. 4 is a sectional view showing a depression-type diffractive light modulator using a piezoelectric material, which was developed by Samsung Electro-Mechanics.

FIG. 4 is a sectional view illustrating a depression-type diffractive light modulator using a piezoelectric material, which was developed by Samsung Electro-Mechanics.

Referring to FIG. 4, the depression-type thin film piezoelectric light modulator developed by Samsung Electro-Mechanics includes a silicon substrate 40 and a plurality of elements 42a to 42n.

In this case, the elements 42a to 42n have uniform widths, are alternately arranged, and form the depression-type thin film piezoelectric light modulator. Alternatively, the elements 42a to 42n may be alternately arranged to have different widths and may form the depression-type thin film piezoelectric light modulator. Meanwhile, the elements 42a to 42n may be spaced apart from one another by regular intervals (each of the intervals is substantially identical to the width of the elements), in which case a micromirror layer formed on the entire top surface of the silicon substrate 40 diffracts incident light by reflecting the light.

The silicon substrate 40 has a depressed portion to provide an air gap to the elements 42a to 42n. An insulation layer 41 is deposited on the top surface of the silicon substrate 40. The ends of the elements 42a to 42n are attached to both ends of the silicon substrate 40 beside the depressed portion.

The elements 42a (although only the element 42a is described herein, the remaining elements 42b to 42n have the same construction and operation) has a rod shape. The element 42a includes a bottom support 43a, the bottom surfaces of both ends of which are attached to both ends of the silicon substrate 40 beside the depressed portion of the silicon substrate 40 so that the center portion of the element 42a can be spaced apart from the depressed portion of the silicon substrate 40, and the center portion of which is located above the depressed portion of the silicon substrate 40 and can move perpendicularly.

The element 42a further includes a bottom electrode layer 44a formed on the left side of the bottom support 43a and adapted to provide piezoelectric voltage, a piezoelectric material layer 45a formed on the bottom electrode layer 44a and adapted to contract and expand and, thus, generate perpendicular driving force when voltage is applied to both ends thereof, and a top electrode layer 46a formed on the piezoelectric material layer 45a and adapted to provide piezoelectric voltage to the piezoelectric material layer 45a.

The element 42a further includes a bottom electrode layer 44a' formed on the right side of the bottom support 43a and adapted to provide piezoelectric voltage, a piezoelectric material layer 45a' formed on the bottom electrode layer 44a' and adapted to contract and expand and, thus, generate perpendicular driving force when voltage is applied to both ends thereof, and a top electrode layer 46a' formed on the piezoelectric material layer 45a' and adapted to provide piezoelectric voltage to the piezoelectric material layer 45a'.

Korean Pat. Appl. No. 2004-74875. filed Sep. 18. 2004, discloses a projection-type light modulator in detail, in addition to the depression-type light modulator described above.

Figure 5:
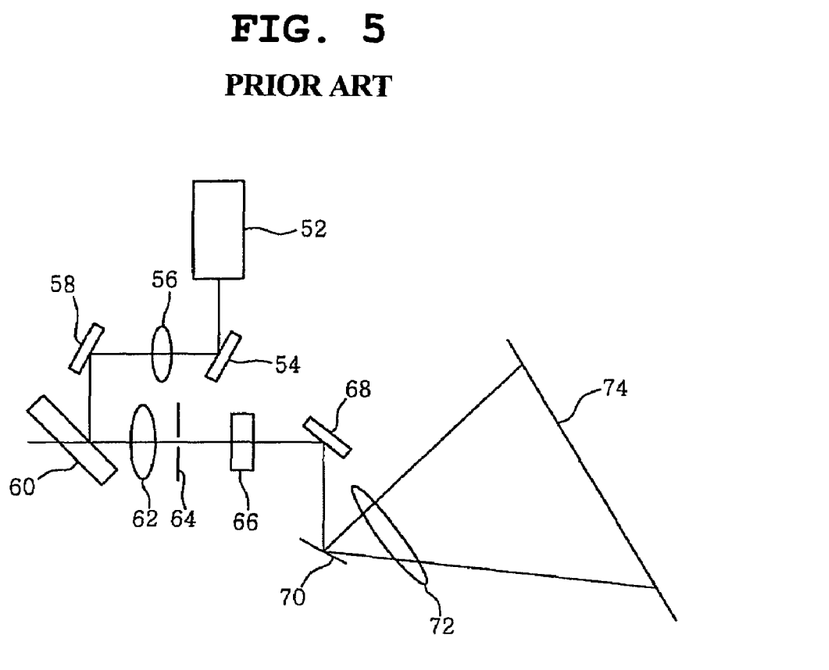
FIG. 5 is a diagram showing an example of an optical apparatus, which employs a GLV device, that is, an optical modulation device, using a MEMS device, or the piezoelectric diffractive light modulator made by Samsung Electro-Mechanics.

FIG. 5 illustrates an example of an optical apparatus, which employs a GLV device, that is, an optical modulation device, using a MEMS device, or the piezoelectric diffractive light modulator made by Samsung Electro-Mechanics. In this example, a case where the optical apparatus is applied to a laser display is described.

A laser display 51 related to the example is used as a projector for a large screen, more particularly, a digital image projector, or as an image projection device for a computer.

As shown in FIG. 5, the laser display 51 includes a laser light source 52, a mirror 54 disposed opposite the laser light source 52, an illumination optical system (lens group) 56 and a GLV device or a piezoelectric diffractive light modulator 58 that serves as an optical modulation element.

The laser display 51 further includes a mirror 60 for reflecting laser light the optical intensity of which is modulated by the GLV device or piezoelectric diffractive light modulator 58, a projection lens 62, a filter 64, a diffuser 66, a mirror 68, a galvano scanner 70, a projection optical system (lens group) 72 and a screen 74.

In the conventional laser display 51, laser light radiated from the laser light source 52 is incident on the GLV device or piezoelectric diffractive light modulator 58 through the mirror 54 from the illumination optical system 56.

Further, the laser light is spatially modulated by being diffracted by the GLV device or piezoelectric diffractive light modulator 58, reflected by the mirror 60, and then separated by the projection lens 62 on a diffraction order basis. Thereafter, only signal components are extracted from the laser light by the filter 64.

Thereafter, the laser spectrum of the image signal is reduced by the diffuser 66, and spread over the space by the galvano scanner 68 synchronized with the image signal through the mirror 68, and is then projected by the projection optical system 70 onto the screen 72.

According to the prior art, if the distance between the diffraction gratings of the diffractive light modulator is shortened, the diffraction angle increase. As a result, the Numerical Aperture (NA) of the lens system located behind the projection lens increases.

Figure 6A:
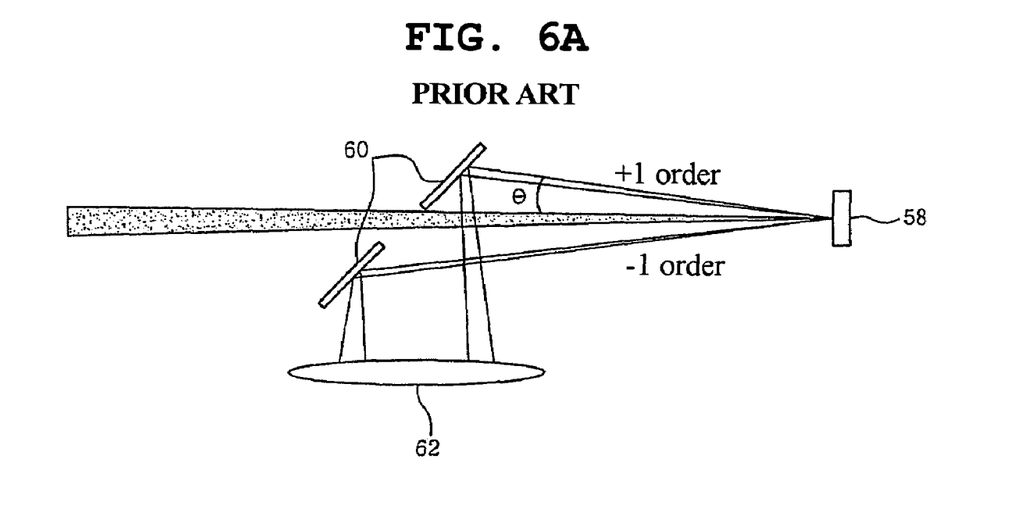
FIG. 6A is a view illustrating an example of a conventional optical system having a high diffraction angle.

FIG. 6A shows an example of a prior art optical system having a high diffraction angle. If the diffraction angle θ is large, the NA of the projection lens increases.

Figure 6B:
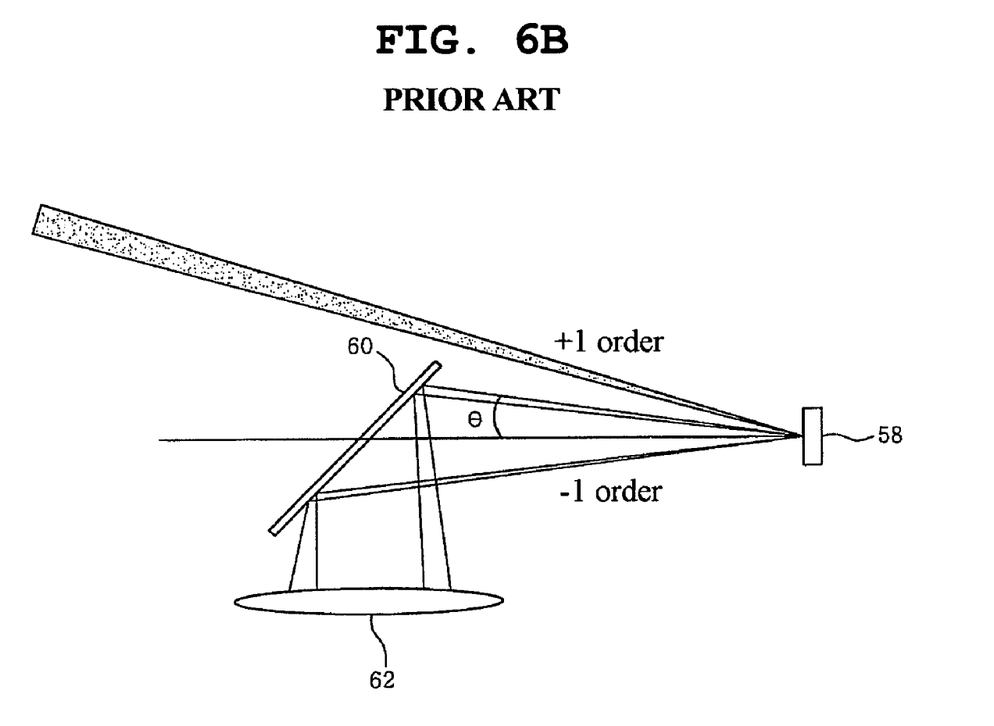
FIG. 6B is a view showing another example of the conventional optical system having a high diffraction angle.

FIG. 6B is a view illustrating another example of a prior art optical system having a high diffraction angle. If the incidence angles of illumination beams are different but the diffraction angle θ is large, the NA of the projection lens increases, which is the same as in the embodiment of FIG. 6A. As described above, when the NA of the lens system, such as a projection lens, located behind the diffractive light modulator increases, there are many limitations in designing the laser display. Further, if the NA is large, there is great difficulty in designing a lens because F/# is low.

Moreover, light progressing toward the center of the after-edge lens system, such as the projection lens, forms a radical axis optical system, which improves the performance of the lens. However, the structures of FIGS. 6A and 6B are disadvantageous in that the central portion of the after-edge lens system is not used but the peripheral portion of the after-edge lens system is used, so that it is difficult to expect good performance.

SUMMARY OF THE INVENTION

Accordingly, the present invention has been made keeping in mind the above problems occurring in the prior art, and an object of the present invention is to provide a display device using a light modulator, in which the NA of a lens system, which is used to focus diffracted light beams having + and − orders that are formed by light modulators, is significantly reduced.

In order to accomplish the above object, the present invention provides a display device using a light modulator and having an improved numerical aperture (NA) of an after-edge lens system, including an illumination lens for converting light output from a light source into linear parallel light, and outputting the linear parallel light; a diffractive light modulator for producing diffracted light beams having a plurality of diffraction orders by modulating the linear parallel light incident from the illumination lens according to an external control signal; an NA improvement unit for causing + and − diffracted light beams of the diffracted light beams to come close to each other; a filter system for passing only some of the diffracted light beams having predetermined orders, therethrough; and a projection system for focusing the diffracted light beams onto an object and allowing the focused diffracted light to scan the object.

BRIEF DESCRIPTION OF THE DRAWINGS

The above and other objects, features and advantages of the present invention will be more clearly understood from the following detailed description taken in conjunction with the accompanying drawings, in which:

FIG. 8A~8C is a view showing the path of light passed through an illumination lens of FIG. 7;

DESCRIPTION OF THE PREFERRED EMBODIMENTS

The present invention is described in detail in connection with preferred embodiments with reference to FIGS. 7 to 13 below.

Figure 7:
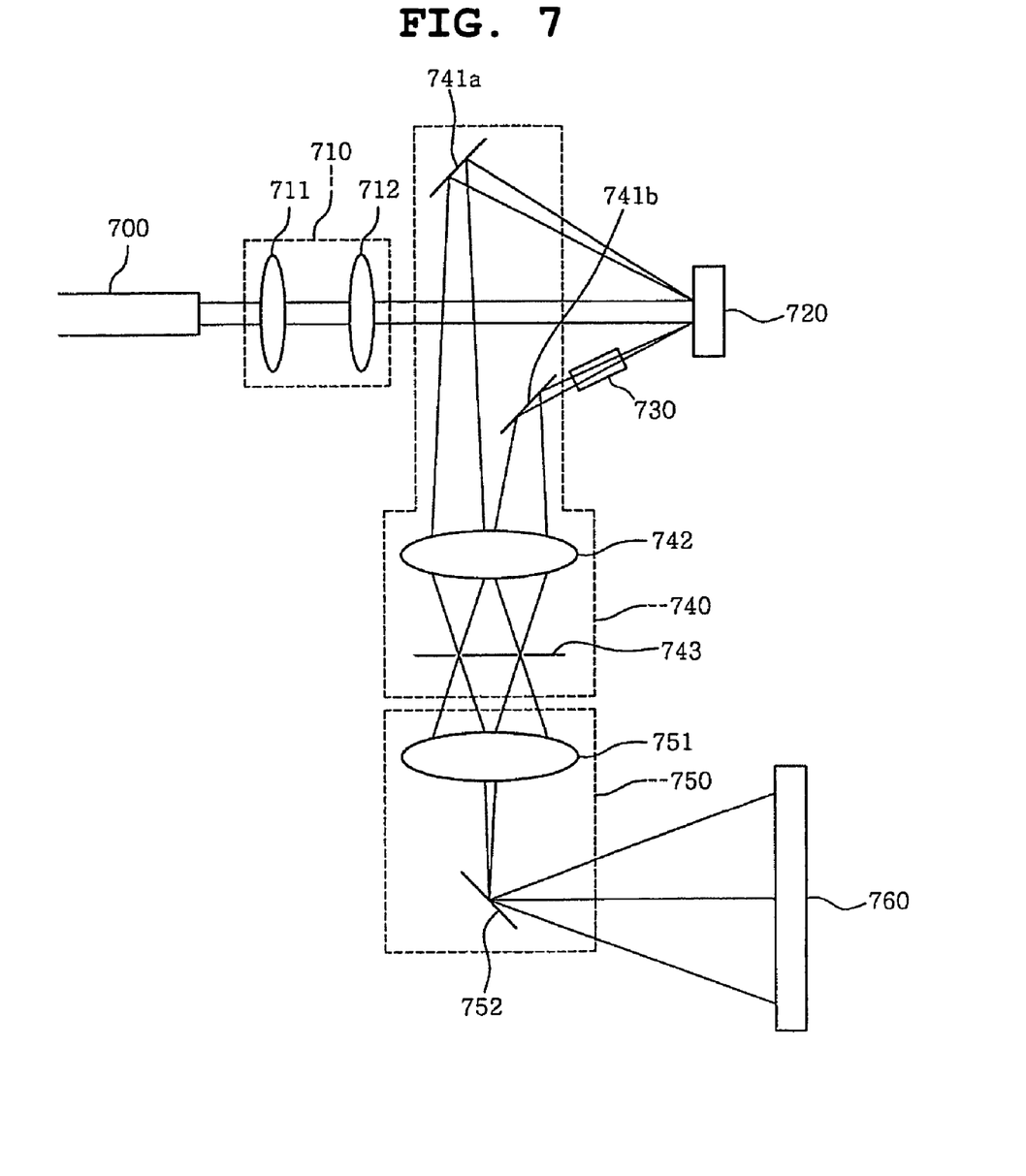
FIG. 7 is a view showing the construction of a display device using a light modulator and having an improved NA of an after-edge lens system according to an embodiment of the present invention.

FIG. 7 is a view illustrating the construction of a display device using a light modulator and having an improved NA of an after-edge lens system according to an embodiment of the present invention.

Referring to FIG. 7, the display device using the light modulator and having the improved NA of the after-edge lens system according to the embodiment of the present invention includes a light source 700, an illumination lens 710, a diffractive light modulator 720, an optical path compensator 730, a filter system 740, a projection system 750 and a screen 760.

A light source fabricated using a semiconductor, such as a Light Emitting Diode (LED) or Laser Diode (LD), may be used as the light source 700.

Figure 8A:
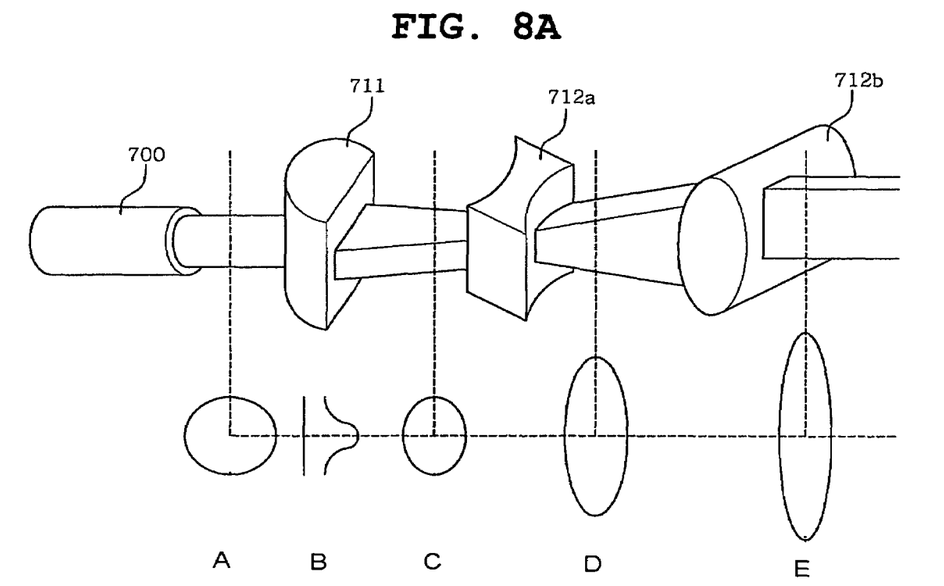

A cross section of the light sources 700 is shown in "A" of FIG. 8A~8C. Referring to "A" of FIG. 8A~8C, the cross section of the light source 700 is circular, and the intensity profile of the light beam has Gaussian distribution as shown in "B" of FIG. 8A~8C.

The illumination lens 710 converts incident light into linear parallel light having an elliptical cross section. The illumination lens 710 includes a cylinder lens 711 and a collimator lens 712.

That is, the illumination lens 710 converts a light beam, which is radiated from the light source 700, into linear light coplanar with optical paths, and then focuses it on a diffractive light modulator 720, which will be described later.

In this case, the cylinder lens 711 converts the parallel light, which is radiated from the light source 700, into linear light shown in "C" of FIG. 8A-8C, and then allow the linear light to be incident on the diffractive light modulator 720 through the collimator lens 712.

In this case, the collimator lens 712 converts spherical light, which is radiated from the light source 700 through the cylinder lens 711, into parallel light, and then allows it to be incident on the diffractive light modulator 720.

The collimator lens 712 includes a concave lens 712a and a convex lens 712b, as shown in FIG. 8A~8C.

Figure 8B:
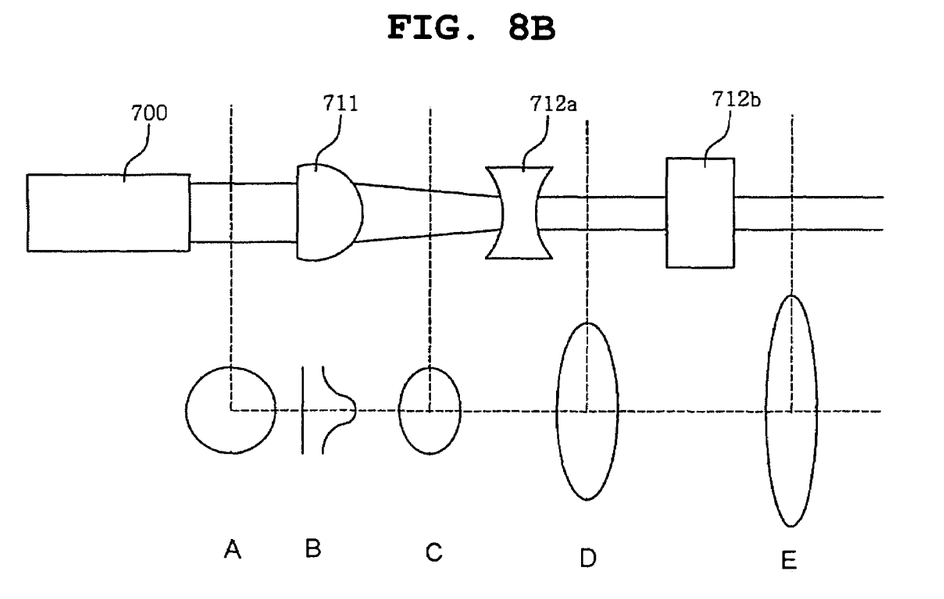
Figure 8C:
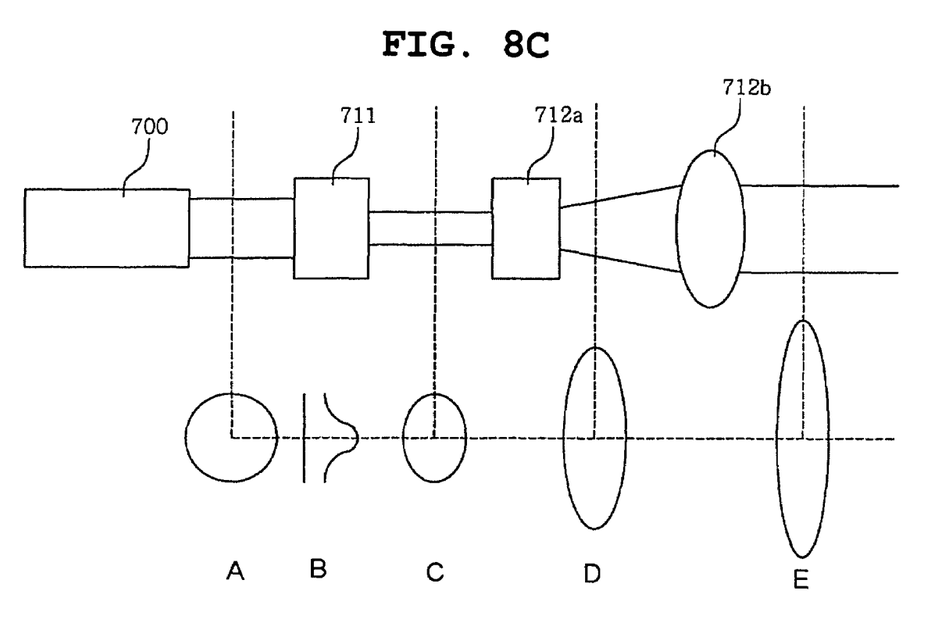

The concave lens 712a perpendicularly spreads linear light incident from the cylinder lens 711, as shown in "D" of FIG. 8A~8C, and then allows it to be incident on the convex lens 712b. The convex lens 712b converts the light beam incident from the concave lens 712a into parallel light, as shown in "E" of FIG. 8A, and then outputs the parallel light. FIG. 8A is a perspective view illustrating an optical system including a light source, a cylinder lens and a collimator lens, FIG. 8B is a plan view of FIG. 8A, FIG. 8C is a side sectional view of FIG. 8A.

The diffractive light modulator 720 diffracts incident light to output diffracted light having a plurality of diffraction orders. The filter system 740 passes some of diffracted light beams having desired orders through the projection system 750.

Figure 9:
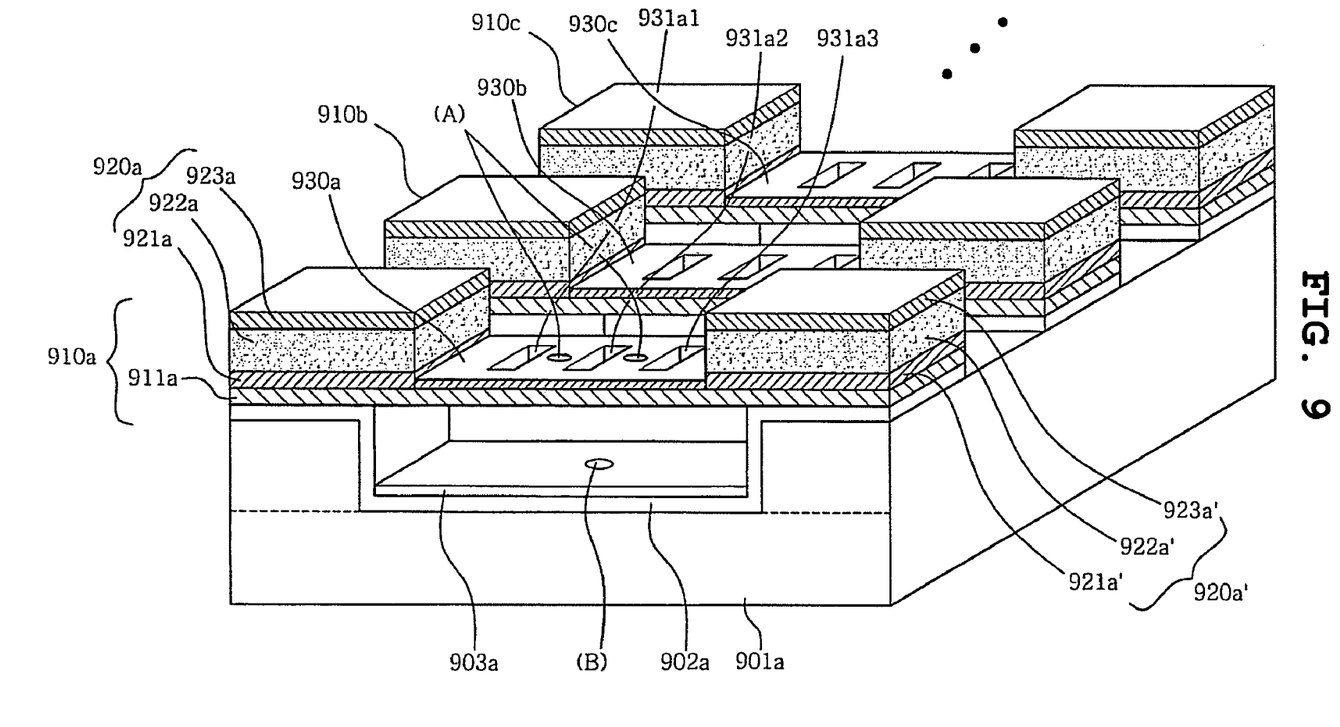
FIG. 9 is a view showing an embodiment of the diffractive light modulator of FIG. 7.

An example of the diffractive light modulator 720 is shown in FIG. 9.

Referring to FIG. 9, the diffractive light modulator according to the embodiment of the present invention includes a silicon substrate 901, an insulation layer 902, a lower micro mirror 903, and a plurality of elements 910a to 910n. Although, in the present embodiment, the insulation layer and the lower micro mirror are separately constructed, the insulation layer itself can function as the lower micro mirror if it has a light-reflecting characteristic.

The silicon substrate 901 is provided with a depressed portion to provide air spaces to the elements 910a to 910n. The insulation layer 902 is formed on the silicon substrate 901. The lower micro mirror 903 is deposited on the insulation layer 902 above the depressed portion of the silicon substrate 901. The bottoms of the elements 910a to 910n are attached to both sides of the insulation layer 902 beside the depressed portion of the silicon substrate 901. The silicon substrate 901 can be fabricated of a single material such as Si, $Al_2O_3$, $ZrO_2$, quartz or $SiO_2$. The upper and lower layers (divided by dotted lines in the drawing) of the silicon substrate 901 can be fabricated of heterogeneous materials.

The lower micro mirror 903 is deposited above the silicon substrate 901, and diffracts incident light by reflecting it. The lower micro mirror 903 can be fabricated of a metallic material such as Al, Pt, Cr or Ag.

The element 910a (although only the element 910a is described herein, the remaining elements have the same construction and operation) has a ribbon shape. The element 910a includes a lower support 911a, both sides of the bottom of which are attached to both sides of the insulation layer 902 beside the depressed portion of the silicon substrate 901, so that the central portion of the lower support 911a is spaced apart from the depressed portion of the silicon substrate 901.

Piezoelectric layers 920a and 920a' are formed on both sides of the lower support 911a. Driving force is provided to the element 910a by the contraction and expansion of the piezoelectric layers 920a and 920a'.

The lower support 911a may be fabricated of Si oxide such as $SiO_2$, Si nitride such as $Si_3N_4$, a ceramic substrate such as Si, $ZrO_2$ and $Al_2O_3$, and Si carbide. However, the lower support 911a may be omitted when necessary.

Each of the piezoelectric layers 920a and 920a' includes lower electrode layers 921a and 921a' configured to provide a piezoelectric voltage, piezoelectric material layers 922a and 922a' formed on the lower electrode layers 921a and 921a' and configured to contract and expand and generate vertical driving force when voltages are applied to both surfaces thereof, and upper electrode layers 923a and 923a' formed on the piezoelectric material layers 922a and 922a' and configured to provide a piezoelectric voltage to the piezoelectric material layers 922a and 922a'. When voltage is applied to the upper electrode layers 923a and 923a' and the lower electrode layers 921a and 921a', the piezoelectric material layers 922a and 922a' contract and expand, thus causing vertical movement of the lower support 911a.

The electrodes 921a, 921a', 923a and 923a' may be fabricated of a material such as Pt, Ta/Pt, Ni, Au, Al or $RuO_2$, and may be deposited by sputtering or evaporation to have a thickness within a range of 0.01 to 3 μm.

Meanwhile, an upper micro mirror 930 is deposited on the center portion of the top of the lower support 911a, and includes a plurality of open holes 931a1 to 931a3. In this case, the open holes 931a1 to 931a3 preferably have a rectangular shape, but may have any closed curve shape such as a circle or an ellipse. When the lower support 911a is fabricated of a light-reflective material, the upper micro mirror 930 is not necessary. In this case, the lower support 911a may function as the upper micro mirror.

The open holes 931a1 to 931a3 pass light incident on the element 910a therethrough, and allow the light to be incident on the portion of the lower micro mirror 903 corresponding to the portion where the open holes 931a1 to 931a3 are formed, so that the lower micro mirror 903 and the upper micro mirror 930 can form a pixel.

That is, for example, the portion "A" of the upper micro mirror 930 where the open holes 931a1 to 931a3 are formed, and the portion "B" of the lower micro mirror 903 can form a single pixel.

In this case, the incident light, which passes through the portion where the open holes 931a1 to 931a3 of the upper micro mirror 930 are formed, can be incident on the corresponding portion of the lower micro mirror 903. When the distance between the upper micro mirror 930 and the lower micro mirror 903 is an odd multiple of λ/4, maximally diffracted light is produced. In addition, an open hole-type diffractive light modulator applicable to the present invention is disclosed in Korean Pat. Appl. No. 2004-030199.

Meanwhile, the diffractive light modulator 720 forms diffracted light by diffracting linear light incident from the illumination lens 710, and cause the diffracted light to be incident on the filter system 740.

Figure 10A:
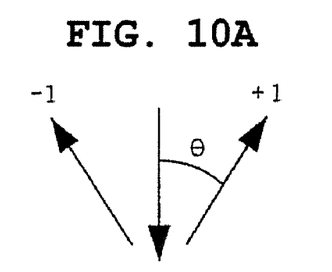
FIGS. 10A and 10B are views showing the diffraction angles of diffracted light beams generated by the diffractive light modulator.
Figure 10B:
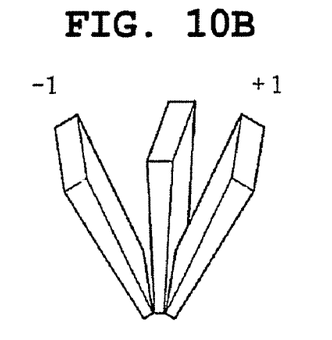

In this case, +1-order diffracted light and −1-order diffracted light, which are formed when the linear light incident from the illumination lens 710 is perpendicularly incident on the diffractive light modulator 720, are shown in FIGS. 10A and 10B.

FIG. 10A shows that, when incident light is perpendicularly incident, the +1-order diffracted light and the −1-order diffracted light are formed in both directions. An angle θ that is formed with respect to the incident light is proportional to the wavelength. That is, the longer the wavelength, the larger the angle θ.

FIG. 10B shows +1-order linear diffracted light and −1-order linear diffracted light, which are formed when linear parallel light is incident on the diffractive light modulator, in three dimensions.

Meanwhile, the filter system 740 includes a pair of NA improvement mirrors 741a and 741b, a projection lens 742 and a spatial filter 743.

Figure 11:
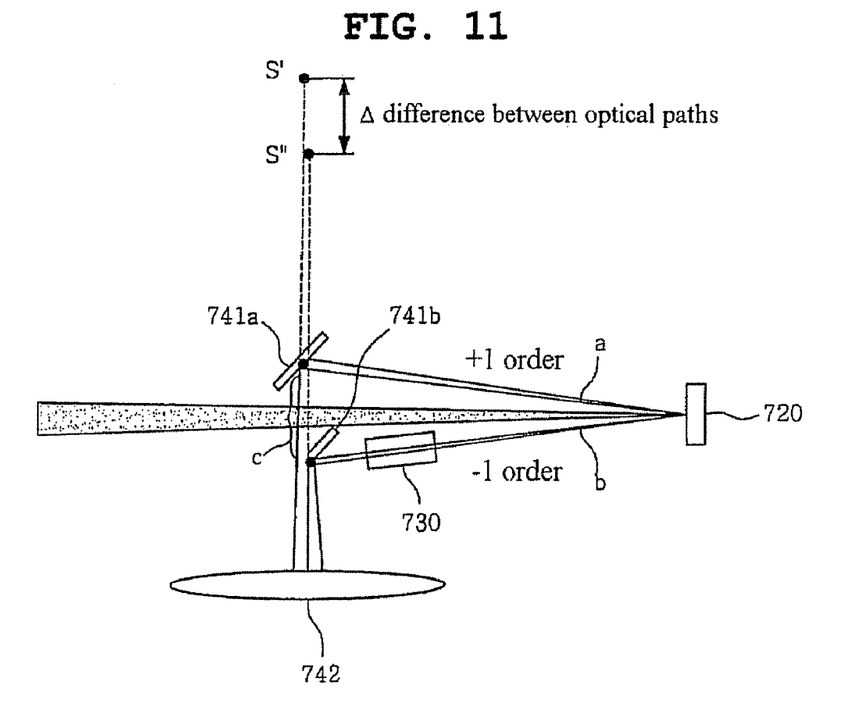
FIG. 11 is a view illustrating an improvement in the NA and compensation for the difference between optical paths.

In this case, the NA improvement mirrors 741a and 741b have are independent of each other and have different reflection angles, and reflect incident diffracted light having corresponding diffraction orders. That is, the NA improvement mirror 741a reflects +1-order diffracted light, and the NA improvement mirror 741b reflects −1-order diffracted light. In this case, the NA improvement mirror 741a and 741b have different reflection angles, so that, if the +1-order diffracted light and the −1-order diffracted light can be converged as shown in FIG. 11, the NA of the projection lens 742 can be improved and, thus, a lens having a low NA can be used. From FIG. 11, it can be understood that the NA improvement mirrors 741a and 741b are independent of each other and have different reflection angles. The reflection angle of the NA improvement mirror 741a is greater than that of the NA improvement mirror 741b.

Furthermore, from FIG. 11, it can be understood that optical paths "a" and "b" along which the diffracted light formed by the diffractive light modulator 720 progresses toward the NA improvement mirrors 741a and 741b are the same.

However, it can be understood that the +1-order diffracted light reflected from the NA improvement mirror 741a and the −1-order diffracted light reflected from the NA improvement mirror 741b have a difference "c" in their optical paths. That is, it can be understood that there occurs a path difference c of S′−S″ in the drawing. This difference between the optical paths may not influence the application of the display device using the light modulator and having the improved NA, which can be solved by locating an optical path compensator on the optical path of the −1-order diffracted light.

In this case, the optical path compensator can be made of a material whose refractive index is not 1. Glass through which light can be transmitted may be used as the material of the optical path compensator.

If a compensation medium is used as the optical path compensator, the length of a compensated optical path can be usually determined by the following Equation 1 when the refractive index of the compensation medium is N and the thickness of the compensation medium is t.

$$\Delta = (N-1) * t \quad (1)$$

The projection lens separates incident diffracted light beams on an order basis, and then converges the light beams. The spatial filter 743 has spatially separated slits, and, therefore, can transmit only diffracted light beams having desired orders.

Figure 12:
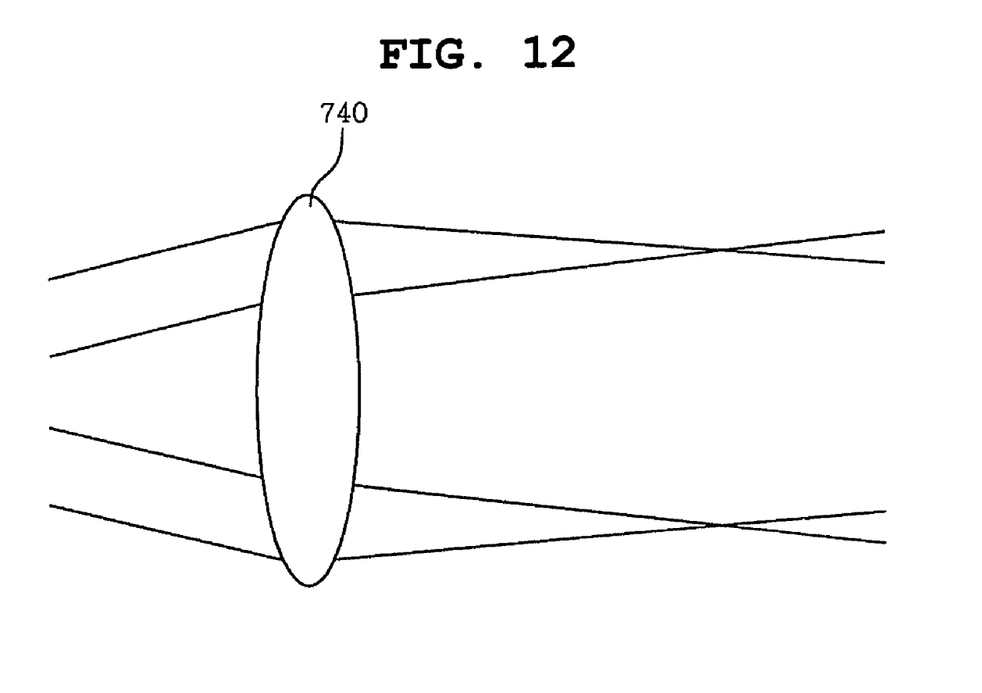
FIG. 12 is a view showing the path of light passed through the projection lens of FIG. 7.
Figure 13:
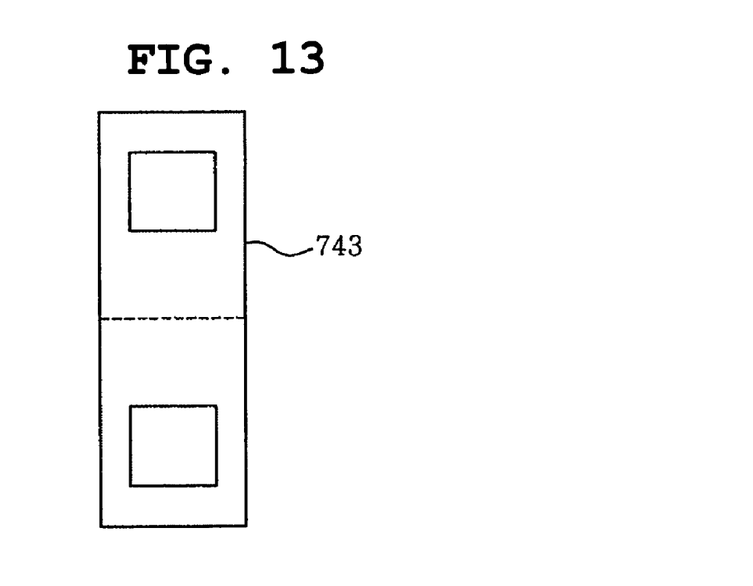
FIG. 13 is a front view showing the spatial filter of FIG. 7.

In this case, the projection lens 742 focuses the light beams output from the NA improvement mirrors 741a and 741b, as shown in FIG. 12. The +1-order diffracted light is focused on a location above a location on the 0-order diffracted light is focused, and the −1-order diffracted light is focused on a location below the location on which the 0-order diffracted light is focused. If the slits of the spatial filter 743 are located near the focal points, only diffracted light having desired orders can be transmitted through the spatial filter 743. As shown in FIG. 13 showing the front view of the spatial filter 743, the location of the focal point of the +1-order diffracted light and the location of the focal point of the −1-order diffracted light are different. Thus, the +1-order diffracted light and the −1-order diffracted light can be separated using the spatial filter 743.

The projection system 750 projects incident diffracted light onto the screen 760. That is, the projection system 750 serves to focus diffracted beams having predetermined diffraction coefficients, which are incident through the spatial filter 743, onto the screen 760, thus forming a spot. In detail, the projection system 750 includes a projection lens 751 and a galvano mirror 752.

The projection lens 751 serves to focus the +1-order diffracted light and the −1-order diffracted light. The galvano mirror 752 serves to allow the beam to scan the screen 760.

As described above, in accordance with the present invention, an increase in the NA of a lens is not required even when a diffraction angle increases, so that the present invention is advantageous in that an optical system can be easily designed.

Further, in accordance with the present invention, + order diffracted light and − order diffracted light can be converged, so that a radical axis optical system can be designed, thus improving the performance of a lens.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device using a light modulator and having an improved numerical aperture (NA) of an after-edge lens system, comprising:
   an illumination lens for converting light output from a light source into linear parallel light, and outputting the linear parallel light;
   a diffractive light modulator for producing diffracted light beams having a plurality of diffraction orders by modulating the linear parallel light incident from the illumination lens according to an external control signal;
   an NA improvement unit comprising a first NA improvement mirror having a first reflection angle for reflecting + order diffracted light beams of the diffracted light beams and a second NA improvement mirror independent of the first NA improvement mirror and having a second reflection angle for reflecting − order diffracted light beams of the diffracted light beams, the first and second reflection angles being such that + order diffracted light beams reflected from the first NA improvement mirror and − order diffracted light beams reflected from the second NA improvement mirror come close to each other;
   a filter system for receiving diffracted light beams from the first and second NA improvement mirrors and passing only some of the diffracted light beams having predetermined orders, therethrough; and
   a projection system for focusing the diffracted light beams onto an object and allowing the focused diffracted light to scan the object.

2. The display device as set forth in claim 1, further comprising an optical path compensator disposed between the diffractive light modulator and the NA improvement unit to compensate for a difference between optical paths of the + and − order diffracted light beams of the diffracted light beams output from the diffractive light modulator.

3. The display device as set forth in claim 2, wherein the optical path compensator is formed of a compensation medium.

4. The display device as set forth in claim 1, wherein the filter system comprises:
   a projection lens for separating the diffracted light beams on an order basis; and
   a spatial filter for passing only some of the diffracted light beams, having desired orders, therethrough.

* * * * *